June 10, 1969

F. SINGER 3,448,672

MECHANICAL ARRANGEMENT FOR ELECTRONICALLY
CONTROLLED PHOTOGRAPHIC SHUTTER
Filed March 9, 1967

INVENTOR
FRANZ SINGER

BY *Larson and Taylor*

ATTORNEYS

United States Patent Office 3,448,672
Patented June 10, 1969

3,448,672
MECHANICAL ARRANGEMENT FOR ELECTRONICALLY CONTROLLED PHOTOGRAPHIC SHUTTER
Franz Singer, Munich, Germany, assignor to Compur-Werk Gesellschaft mit beschrankter Haftung & Co.
Filed Mar. 9, 1967, Ser. No. 621,834
Claims priority, application Germany, Mar. 11, 1966,
C 38,465
Int. Cl. G03b 9/22
U.S. Cl. 95—63      4 Claims

ABSTRACT OF THE DISCLOSURE

An electronically controlled photographic shutter in which the flow of current to an electromagnet determines the exposure time. A lever system between the armature of the electromagnet and the shutter blade driving ring for holding the shutter open and then allowing it to close after the predetermined time. The system includes a blade driving ring driven by a blade driving member which in turn engages a primary member for holding the shutter open; a delay lever and a preloading lever between the primary member and the armature of the electromagnet. The preloading lever is acted upon by a spring to cause closing of the shutter upon termination of the electromagnetic force, the preloading lever being restrained from acting on the armature and the spring being loaded when the brake driving ring is moved to the shutter closed position.

FIELD OF THE INVENTION

The present invention relates to a photographic shutter having a main driving member adapted to move the blade driving ring to cause shutter blades to open and close the shutter aperture, the time between the opening and closing movements being controlled by an electronic arrangement comprising a holding electromagnet, the armature of which is subject to the action of an accelerating spring opposing the electromagnetic holding force.

SUMMARY OF THE INVENTION

According to the present invention there is provided a photographic shutter having a plurality of shutter blades for selectively opening and closing the shutter aperture. These blades are connected to a blade driving ring surrounding the aperture, which ring is movable under the influence of a blade driving member in one direction to open the shutter aperture and movable in the opposite direction to close the shutter aperture.

The blade ring driving member, once released from its cocked position unwinds to move through a complete cycle to open the shutter and then to move out of the way to allow a spring to close the shutter. However, in shutters of this type a primary member interrupts this movement of the blade ring driving member during its unwinding movement at a point in its cycle when it is still holding the shutter aperture open. Electronic timing means are then employed to determine the moment at which this primary member is removed from the path of the blade ring driving member to allow the latter to complete its cyclical movement thereby allowing the shutter aperture to close.

The arrangement includes an electromagnet which, when energized, acts through a mechanical lever system to hold the primary member in the position to interrupt movement of the blade driving member. When current to the electromagnet is terminated its armature is free to move under the influence of other force exerting means, such as preloaded springs, to remove the primary member from the path of the blade ring driving member.

In shutters of this type it is necessary to exert a force on the armature of the electromagnet, or levers connected thereto, opposing the electromagnetic force so that upon termination of the electromagnetic force, the armature and its associated linkage members will be moved to release the driving member.

It is an object of the present invention to arrange the lever system so that the preloaded spring, hereinafter referred to as the accelerating spring, acting on the armature and its associated levers will not affect the accuracy of movement of those elements which open and close the shutter aperture.

This object is accomplished according to the present invention by employing a preloading lever acted upon by the accelerating spring to urge the armature of the electromagnet in a direction opposite from that of the electromagnetic force. With this arrangement, upon termination of the electromagnetic force, the accelerating spring, acting through the preloading lever, will cause movement of the armature to release the primary member and thereby allow the driving member to close the shutter aperture.

According to a further feature of the present invention, movement of the preloading lever against the armature under the influence of the accelerating spring is controlled by the blade driving ring itself. When the blade driving ring is in the shutter closed position, it restrains the preloading lever from acting on the armature and it loads the accelerating spring. Subsequently, upon opening of the shutter aperture, the blade driving ring releases the preloading lever so that the preloading lever will actually move the armature and its associated levers as soon as the electromagnetic force is removed. This latter movement will in turn allow closing of the shutter aperture which in turn will once again cause restraint of the preloading lever and loading of the accelerating spring.

The electronic circuit for controlling the duration of the exposure time and the switching means for causing operation of the electronic circuit are described more fully in the copending application by Paul Fahlenberg and Rudolf Lang, Ser. No. 586,760, filed Oct. 14, 1966, which application is assigned to the same assignee as that of the present application.

According to one arrangement of the present invention the preloading lever is provided with an arm pivotable about an axis passing through the shutter housing, which arm is engageable with a radially extending lug affixed to the blade driving ring.

In another arrangement of the present invention the preloading lever has a control surface which cooperates with a pin affixed to the blade driving ring for restraining movement of the preloading lever.

Thus, it is an object of this invention to provide an improved electronically controlled photographic shutter wherein the means for closing the shutter do not exert additional forces on the driving members which open and close the shutter.

It is another object of this invention to provide an improved compact electronically controlled delay arrangement which requires minimum parts for controlling the unwinding movement of the shutter driving member.

It is still another object of this invention to provide an improved shutter device which overcomes numerous disadvantages of previous electronically controlled shutter devices.

Other objects and the attendant advantages of the invention will become apparent from the detailed description to follow together with the accompanying drawings.

BRIEF DESCRIPTION OF THE DRAWINGS

The detailed description to follow together with the accompanying drawings are intended only for the purpose of illustrating the preferred embodiments of the invention. It is to be understood that the invention is capable of numerous modifications and variations without departing from the spirit and scope of the invention as set forth in the claims.

In the drawings.

DESCRIPTION OF THE PREFERRED EMBODIMENTS

Figure 1:
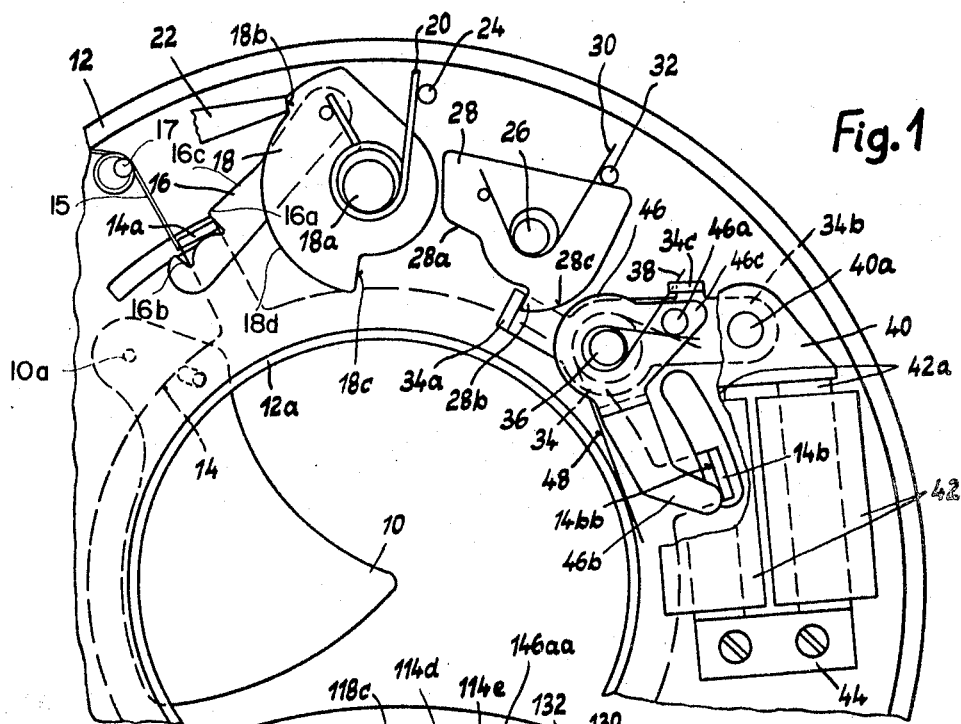
FIGURE 1 is a partial front view of a shutter according to the invention, and shown in the cocked position, with the front plate removed.

For purposes of convenience, terms such as "clockwise," "counterclockwise," "rightward," "leftward," etc., will be used in order to describe the structure and operation of the invention. However, it is to be understood that these terms are employed only with respect to the arrangements of the invention as shown in the drawings. It is to be understood that the invention is capable of any orientation in practice.

FIGURE 1 illustrates a first embodiment of the invention. Shutter blades 10 are mounted in an annular shutter housing 12 and are operated to open and close the objective shutter aperture by means of a blade driving ring 14. The ring 14 has formed thereon a radially extending arm 14a engaging a link 16. The link 16 is pivotally coupled to a main driving member 18 and is continuously urged outwardly away from the shutter objective aperture by resilient means (not shown). The main driving member 18 is mounted for rotation about a spindle 18a which projects out of the shutter housing 12 for engagement to rotate the driving member 18 to load a main spring 20, which spring acts on the one hand against the member 18 to unwind the same and on the other hand against a fixed abutment 24 in the shutter housing. In the loaded and cocked positions of the driving member 18, as shown in the drawing, the nose 18b of this member is engaged by a locking lever 22, shown in part in FIGURE 1, which in turn is coupled to a device (not shown) for moving the lever 22 away from driving member 18 thereby allowing the driving member 18 to unwind under the influence of spring 20. The fixed abutment 24 cooperates with a nose 18c on the member 18 for determining the rest position of the main driving member 18 after a photograph has been taken but before the member 18 has been cocked for the next photograph.

Rotatably mounted on a fixed pin 26 is a primary member 28 of an electrically-controlled delay device. A setting spring 30 of the member 28 biases the latter in the counterclockwise direction and against an abutment 32. In this position, the abutment surface 28a of the member 28 projects into the path of the nose 18c as the driving member 18 unwinds in the counterclockwise direction.

In addition, the primary member 28 has a nose 28b which cooperates with an upwardly-bent arm 34a of a two arm delay lever 34. Lever 34 is mounted for free rotation on a pin 36, and a torsion spring 38 biases the same in the clockwise direction. The lever 34 is preferably of an electrical insulating material, and has an arm 34b which is pivotally connected at 40a to a metallic armature 40 of an electromagnet comprising two magnetic cores 42a and two magnetic windings 42. This electromagnet is connected in the circuit of an electronic device (shown and described in greater detail in the copending application referred to above) for determining the exposure period. The electromagnet is mounted on an insulating plate 44 secured in the shutter housing 12.

Rotatably arranged on the pin 36 above the delay lever 34 is a two-armed preloading lever 46 biased in the counterclockwise direction by an accelerating spring 48. One end of spring 48 bears against the tube 12a whilst its other end engages a pin 46a on the lever 46. The first arm 46b of the preloading lever 46 cooperates with a lug 14b on the blade driving ring 14, whilst the second arm 46c of lever 46 can be applied against a shoulder 34c on the delay lever 34.

The shutter shown in FIGURE 1 operates as follows:

When the shutter is released by moving the locking lever 22 in the counterclockwise direction away from nose 18b, the main driving member 18 is free to unwind under the influence of spring 20 in the counterclockwise direction. At the same time a switch is closed in the electronic device to energize the electromagnet 42, 42a and hold the armature 40 in the position illustrated under the effect of the magnetic force thereby set up. This switch may be operated by the driving ring 14 as shown in the said copending application.

As member 18 unwinds in the counterclockwise direction the link 16 acting at 16a will urge the lug 14a and thus the driving ring 14 counterclockwise thereby rotating the shutter blade 10 in the clockwise direction about their pivot axes 10a to open the shutter aperture. Meanwhile, the driving ring 14 is continuously urged to the shutter closed position by a spring 15 mounted on a pin 17 connected to the shutter housing. When the fully open position of the shutter aperture has been reached, and the blade ring is held in that position by shoulder 16a, the nose 18c of the member 18 is held against further rotation by an abutment surface 28a of a primary member 28.

During the opening movement of blades 10, since the blade driving ring 14 is moved in the counterclockwise direction, its lug 14b releases arm 46b, whereupon the arm 46c of the lever 46, under the action of spring 48, moves counterclockwise against the shoulder 34c of the delay lever 34. After a predetermined period, which can be set as required by an exposure period setter of the shutter and controlled by the electronic device, the current flow through the magnetic windings 42 is terminated and the magnet de-energizes and releases the armature 40.

The two members 34 and 46 are then pivoted in the counterclockwise direction under the action of the preloaded spring 48. This causes arm 34a to move away from nose 28b. As a result, the main driving member 18, released after expiry of the delay period, can continue to unwind in the counterclockwise direction to the rest abutment 24. Further movement of driving member 18 in the counterclockwise direction past the point at which 18c was engaged by 28a will bring the shoulder 16b of link 16 in action as a result of which the lug 14a will be urged by said shoulder 16b in the clockwise direction to close the shutter aperture.

Movement of the member 18 from its engagement with abutment 28a to its abutment with 24 occurs since the spring 20 is much sronger than the spring 30. Consequently, with the arm 34a out of the way of nose 28b, the member 18 simply pushes the primary member 28 out of its way as 18c rotates counterclockwise until nose 18c rests on abutment 24. Meanwhile, the member 28, under the influence of spring 30, simply rests on the raised outer surface 18d of the member 18.

During the closure of the blades 10 as the blade driving ring 14 is moved back in the clockwise direction, its lug 14b engages the arm 46b of the preloading lever 46 turning it in the clockwise direction.

During its clockwise pivotal movement, the lever 46 loads the spring 48 and, towards the end of the closure movement of the blades 10, it interrupts the engagement between the parts 46c and 34c because the lever 34 is held stationary in consequence of the application of its arm 34a against the peripheral portion 28c of the primary member 28. Since, however, the pin 46a which turns with the lever 46, forms a support for the return spring 38 of the lever 34, this spring is preloaded.

If the shutter is to be recocked for the taking of a fresh photograph, the spindle 18a, which is adapted to be coupled for this purpose, for example, with the film-feed gear of the camera, is turned in the clockwise direction. The spring 20 of the main driving member 18 is loaded until the locking lever 22 drops behind the nose 18b and holds the main driving member 18 in the cocked condition. The lug 14a is held to the right by spring 15 until the first portion of the cocking motion while shoulder 16a is out of engagement with, and in front of the lug 14a, whereby the link 16 moves to the left, until the last portion of the cocking motion at which time link 16 moves again to the right until, at the cocked position, the shoulder 16a rests against side of lug 14a. This procedure is explained in greater detail in the said copending application. During the cocking motion the primary member 28 resumes its rest position, illustrated in FIGURE 1, under the action of the spring 30 as soon as raised surface 18d moves out of the path of part 28a. Upon return of 28 to the position of FIGURE 1, the delay lever 34 can then urge the armature 40 against the magnetic core 42.

Figure 2:
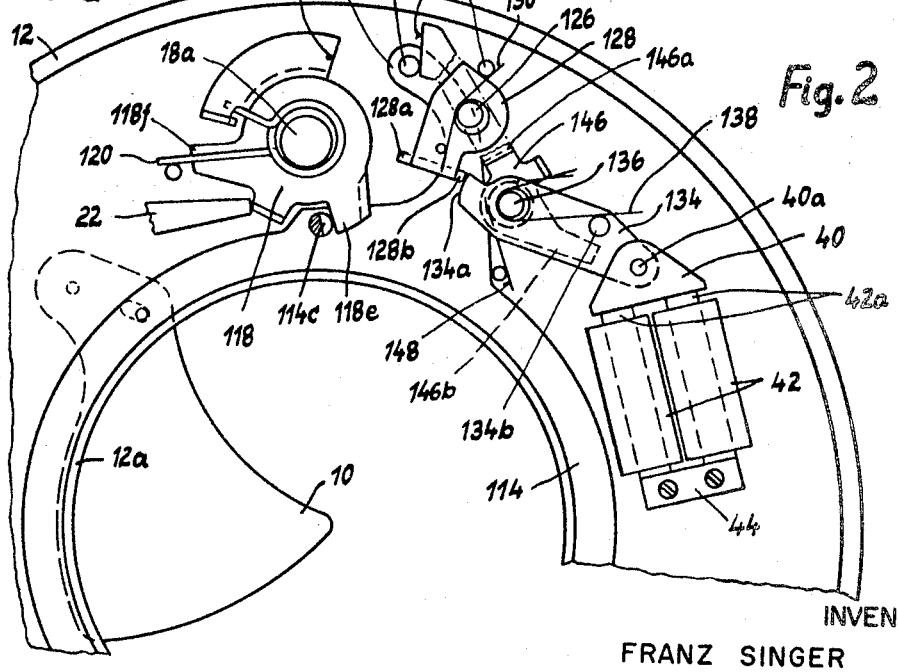
FIGURE 2 is a partial front view of another embodiment of the shutter according to the present invention shown in the cocked position, with the front plate removed.

A somewhat modified embodiment is illustrated in FIGURE 2. In contrast to the first embodiment, the blade driving ring 114 is here provided, in known fashion, with an axially resilient opening pin 114c and a closing pin 114e arranged on its extended arm 114d. The main driving member 118 has an opening lug 118e and a closing lug 118f. In the cocked condition illustrated the opening lug 118e engages behind pin 114c.

The primary member 128 of the delay mechanism is mounted for free rotation of a fixed pin 126. The primary member 128 is urged in the clockwise direction against an abutment 132 by a spring 130. The primary member 128 has a downwardly-bent arm with its lateral surface 128a projecting into the path of travel of nose 118c, while the right-hand lateral surface 128b of this arm cooperates with a locking nose 134a of the delay lever 134. Lever 134 is mounted at 136 and biased in the clockwise direction by its return spring 138.

A double-armed preloading lever 146 pivotally arranged on the pin 136 below the delay lever 134, is biased in the counterclockwise direction by the spring 148. The arm 146a of the preloading lever 146 is offset to enable it to move freely above the pin 126. Lever 146 also has a control surface 146aa which co-acts with the closing pin 114e. An arm 146b on the lever 146 can be brought into engagement with a pin 134b on the delay lever 134.

The main driving member 118 rotates in the clockwise direction under the action of the spring 120 when locking lever 22 is removed. The opening lug 118e of the main driving member 118 then drives the opening pin 114c of the blade driving ring 114 along with it so that the latter moves in the counterclockwise direction and causes the blades 10 to open the shutter aperture. On reaching the fully-open condition the nose 118c encounters surface 128a and consequently the primary member 128 prevents further travel of the member 118. During the rotary movement of the blade driving ring 114 in the counterclockwise direction the pin 114e of this ring is freed from the control surface 146aa, allowing the preloading lever 146 to move slightly in the counterclockwise direction of rotation under the action of the spring 148 until its arm 146b strikes the pin 134b.

The blades 10 commence to close when the magnetic cores 42a are released on de-energization of armature 40. As a consequence the members 134 and 146 turn in the counterclockwise direction under the action of the preloaded accelerating spring 148 and thereby break the locking engagement at 128b, 134a. Thereupon the main driving member 118, now released, continues to unwind in the counterclockwise direction, its closure lug 118f contacting the closing pin 114e and moving back the blade driving ring 114 in the clockwise direction to close the blades 10. During this closing movement the pin 114e engages the control surface 146aa, as a result of which the preloading lever 146 is pivoted in the clockwise direction against the action of spring 148. The delay lever 134 cannot follow this pivotal movement of the preloading lever, being prevented from so doing by the primary member 128 which has been turned back. It is only when the shutter is again cocked that the primary member 128 slides away from the main driving member 118 and assumes its rest position (FIGURE 2). The delay lever 134 and its armature 40 can now resume their starting positions under the action of the return spring 138.

The arrangement of the preloading lever and armature accelerating spring prescribed by the present invention affords the advantage that the loading of this spring is only implemented towards the end of the closure movement of the shutter blades by the blade driving ring. Thus, the actual exposure procedure remains practically unaffected. As a result, the power of the main driving spring can be chosen only so small as is required for producing the minimum shutter period.

Moreover, the constructional elements which are required to achieve the object sought by this invention, require only a simple and compact arrangement of the delay mechanism for the shutter driving member.

Although two embodiments of the invention have been shown and described with considerable detail, it is to be understood that these embodiments have been shown and described merely for purposes of illustration and that the invention is capable of numerous modifications and variations without departing from the spirit and scope of the invention as set forth in the appended claims.

I claim:

1. In a photographic shutter having shutter blades mounted therein for movement in response to operation of a blade driving ring to open and close the shutter aperture, a main driving member mounted in the shutter to operate the said ring, an electronic means for determining the exposure period between opening and closing movements of the shutter blades, said means including a holding electromagnet having an armature, and an accelerating spring acting in opposition to the electromagnetic holding force on the armature;

the improvement wherein;
said shutter includes a preloading lever and said accelerating spring engages the preloading lever urging it to act on the armature in opposition to the electromagnetic force, restraining means are connected to the blade driving means for restraining the preloading lever from acting on the armature and for loading the accelerating spring when the blade driving ring is operated to close the shutter aperture, and wherein movement of the driving ring to open the shutter aperture releases the said restraining means thereby allowing the preloading lever to act on the said armature under the force of the spring loaded accelerating spring.

2. A photographic shutter as claimed in claim 1 wherein said preloading lever is mounted for pivotal movement about an axis passing through the shutter, and said blade driving ring is movable circumferentially about the shutter aperture.

3. A photographic shutter as claimed in claim 2 wherein the preloading lever includes a first arm movable about said axis generally towards and away from the said shutter axis, and said restraining means includes a lug affixed to the said ring for acting upon the said first arm to restrain the preloading lever.

4. A photographic shutter as claimed in claim 2 wherein the said preloading lever includes an arm having a control surface thereon, and said restraining means includes a pin affixed to the said ring for acting upon the said surface to restrain the said preloading lever.

References Cited

UNITED STATES PATENTS

| | | | |
|---|---|---|---|
| 3,376,801 | 4/1968 | Fahlenberg | 95—63 XR |
| 3,386,363 | 6/1968 | Renschler | 95—53 |

NORTON ANSHER, *Primary Examiner.*

LEO H. McCORMICK, Jr., *Assistant Examiner.*

U.S. Cl. X.R.

95—53